No. 767,493. PATENTED AUG. 16, 1904.
A. NEUBECK.
THERMOMETER FOR INCUBATORS.
APPLICATION FILED NOV. 2, 1903.
NO MODEL.

WITNESSES
James J. ...
Hattie B. ...

INVENTOR
August Neubeck
BY L. K. Söhn
his ATTORNEY

No. 767,493. Patented August 16, 1904.

UNITED STATES PATENT OFFICE.

AUGUST NEUBECK, OF NEW YORK, N. Y.

THERMOMETER FOR INCUBATORS.

SPECIFICATION forming part of Letters Patent No. 767,493, dated August 16, 1904.

Application filed November 2, 1903. Serial No. 179,511. (No model.)

*To all whom it may concern:*

Be it known that I, AUGUST NEUBECK, a citizen of the United States of America, and a resident of New York, borough of Brooklyn, county of Kings, State of New York, have invented certain new and useful Improvements in Thermometers for Incubators, of which the following is a specification.

This invention has reference to thermometers, and pertains particularly to that class of thermometers which are filled with a liquid which is usually colored and of low specific gravity.

It is the special object of this invention to produce a thermometer of the class described which is particularly adapted for use in incubators, and therefore the scale of the thermometer is preferably from 90° to 110° Fahrenheit. Thermometers of this kind which have a limited scale starting at a relatively high point, in this instance at 90° Fahrenheit, are so constructed that the tube is not too long. Therefore the quantity of liquid introduced therein is such as to bring the liquid up to the scale in a rather short tube. For this reason the liquid in the thermometer when the latter is not in use and in a rather cool place returns completely into the bulb, and if from any cause whatsoever a trace of air is left in the thermometer then same is certainly found on the highest point of the bulb. Upon expansion of the liquid this air is inclosed there and causes disturbances when the liquid further expands up into the capillary tube, and incorrectness in the readings is another result therefrom. This of course is particularly the case with thermometers having their bulbs in a position other than the vertical one usually employed.

In order to avoid the described deficiencies in thermometers of the class above mentioned, I have provided a new thermometer-bulb for same, and particularly for thermometers to be used in incubators for controlling the temperature therein during the artificial hatching of eggs.

The invention is illustrated in the accompanying drawings, in which—

Figure 1:
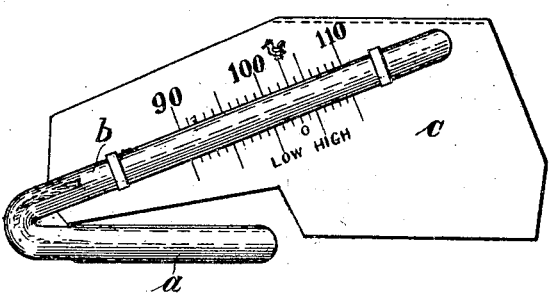
Figure 2:
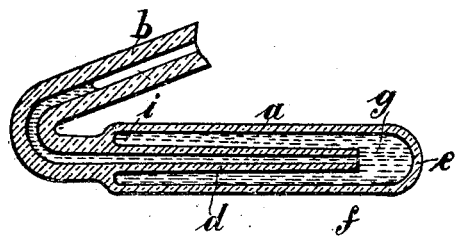
Figure 3:
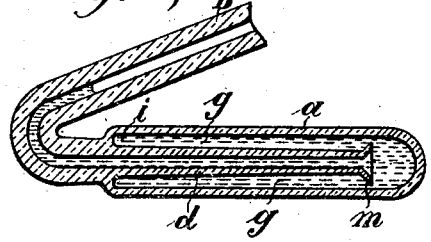
Figure 4:
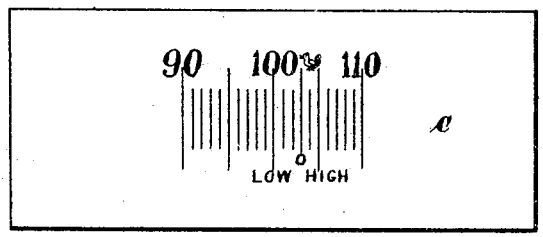

Figure 1 shows a complete thermometer in front elevation which embodies my invention. Fig. 2 is a cross-section of the thermometer-bulb. Fig. 3 represents a modification of the thermometer-bulb, and Fig. 4 illustrates a plain scale.

Similar characters of reference denote like parts in all the figures.

In the drawings, $a$ represents the thermometer-bulb. $b$ is the capillary tube, and $c$ the scale.

In the present invention the bulb blown onto the capillary tube differs from the bulbs heretofore employed. Instead of a plain bulb I have provided a bulb which has inside an extra tube $d$. This tube extends within the bulb according to requirement, in some instances reaching down to almost the rounded-off end $e$ of same. The tube $d$ is joined to the bulb $a$ at the point where the capillary tube is joined thereto by the fusion of the glass. The capillary opening of the tube $b$ coincides with the opening of the inside tube $d$, which is open at its end $f$. Hereby the capillary opening in the tube $b$ and the opening in the inside tube $d$ communicate with the space $g$ of the bulb. As shown in Figs. 1, 2, and 3, the capillary tube is bent under a sharp angle near the bulb, so that the latter practically rests in a horizontal position when the thermometer is in use.

Assuming now that the thermometer has been finished and before sale or after use is subjected to cold, so that the liquid contracts to such a degree as to be completely contained within the bulb, then any trace of air which may be in the capillary tube above the liquid can never reach the point $i$ of the bulb. This is impossible, because before any trace of air can reach the bulb $a$ it would have to travel through the entire length of the inside tube $d$. In no instance will the contraction of the liquid be so great that the latter will retreat down to the open end $f$ of the inside tube $d$. Upon reëxpansion of the liquid any trace of air is forced up into the capillary tube before the liquid and cannot divide the column of liquid in the capillary bore. In this way not only a reliable instrument is obtained, but also a correct one. If there were a bubble of air either in the thermometer-bulb or between the column of liquid in the capillary bore, the thermometer would not be lost; but it would have to be sent back to the manufacturer to be fixed up again. It is plainly seen that the inside tube *d* guards against the described deficiencies without materially increasing the cost of the instrument.

The modification of the bulb shown in Fig. 3 differs from the bulb illustrated in Fig. 2, in so far as its open end *m* is flattened out and is funnel-shaped. In this form the open end *m* nearly fills up the inside space of the bulb *a*. This funnel-shaped open end *m* helps to facilitate the filling of the thermometer during its manufacture. The bulb is, as usual, first heated and partially filled. Then it is heated again, and the vapors of the boiling liquid expel the air from the bulb. Upon cooling the bulb will be gradually filled. However, it happens quite often that then a bubble is still contained in the bulb. By skilful manipulation this bubble of air is allowed to escape through the opening in the tube *d*. The funnel-shaped end of the tube *d* greatly facilitates this, because it presents a larger surface to the escaping air-bubble.

The scale of the thermometer ranges from 90° to 100° Fahrenheit. In addition thereto the word "Low" is found under the line indicating 100° Fahrenheit and the word "High" under the line indicating 105° Fahrenheit. Above the line indicating 103° Fahrenheit there is a small chicken, which indicates that this is the best temperature for the artificial hatching of eggs. The two words and the little chicken are put thereon to make work easier for the attendants. It shows that the temperature of the incubator should never fall below 100° Fahrenheit and never rise above 105° Fahrenheit. If possible, the temperature should constantly be kept at 103° Fahrenheit. The shape of the scale shown in Fig. 1 is made this way for practical reasons. I do not, however, limit myself to this shape of scale. A plain scale, as illustrated in Fig. 4, may likewise be used, the principal feature of the invention being the novel bulb characterized by the inside tube.

The liquid employed in these thermometers may be colored alcohol or a composition of which alcohol is a principal component.

Having thus described my invention, I claim as new and desire to secure by Letters Patent—

1. A thermometer for use in incubators comprising a bulb filled with a colored liquid, an inside tube in said bulb joined thereto by the fusion of the glass and having a funnel-shaped open end, and a capillary tube joined to the bulb by fusion, in combination with a scale ranging about from 90° to 110° Fahrenheit.

2. A thermometer for use in incubators comprising an elongated bulb filled with a colored liquid of low specific gravity, an inside tube in said bulb joined thereto by the fusion of the glass and having a funnel-shaped open end, and a capillary tube joined to the bulb by fusion and bent under a sharp angle near said bulb, in combination with a scale ranging about from 90° to 110° Fahrenheit.

3. In a thermometer for use in incubators, an elongated bulb for the expanding colored liquid of low specific gravity, an inside tube in said bulb joined thereto by the fusion of the glass and having a funnel-shaped open end, and a capillary tube joined to the bulb and bent under a sharp angle near said bulb.

Signed at New York, N. Y., this 31st day of October, 1903.

AUGUST NEUBECK.

Witnesses:
 JAMES J. ASTARITA,
 HATTIE B. LUEDERS.